US005460886A

United States Patent [19]

Ueno et al.

[11] Patent Number: 5,460,886

[45] Date of Patent: Oct. 24, 1995

[54] DC HIGH-VOLTAGE WIRE

[75] Inventors: Keiji Ueno, Osaka; Tomizo Yano; Ikujiro Uda, both of Tochigi, all of Japan

[73] Assignee: Sumitomo Electric Industries, Ltd., Osaka, Japan

[21] Appl. No.: 450,804

[22] Filed: Dec. 14, 1989

[30] Foreign Application Priority Data

Dec. 16, 1988 [JP] Japan .................................. 63-318747

[51] Int. Cl.$^{6}$ .............................. B32B 27/00; D02G 3/00

[52] U.S. Cl. .......................... 428/383; 428/372; 428/375; 428/379; 106/472; 174/105 SC; 174/120 SC; 174/120 SK

[58] Field of Search .................................... 428/383, 379, 428/372, 375; 174/120 SR, 120 SC

[56] References Cited

U.S. PATENT DOCUMENTS

| | | | |
|---|---|---|---|
| 3,769,085 | 10/1973 | Matsubara | 174/120 SR |
| 4,400,580 | 8/1983 | Yamanouchi et al. | 428/372 |
| 4,588,855 | 5/1986 | Kutsuwa et al. | 428/372 |
| 4,857,232 | 8/1989 | Burns, Jr. | 428/372 |

FOREIGN PATENT DOCUMENTS

| | | | |
|---|---|---|---|
| 0029709 | 9/1979 | Japan | 174/121 A |
| 0030111 | 9/1979 | Japan | 174/120 SR |
| 1424296 | 2/1976 | United Kingdom . | |
| 2187589 | 9/1987 | United Kingdom | 428/383 |

OTHER PUBLICATIONS

Central Patent Index, Japanese Patent Abstracts, Unexamined, Derwent, London J 49015741 DW 7437 and JP–A–49–15 741 (Hitachi).

*Primary Examiner*—Patrick J. Ryan
*Assistant Examiner*—J. M. Gray
*Attorney, Agent, or Firm*—Sughrue, Mion, Zinn, Macpeak & Seas

[57] ABSTRACT

A DC high-voltage wire comprising: a conductor; a resin composition layer coating the conductor, the resin composition layer comprising a polyolefin resin containing carbon black in an amount of not less than 10 parts by weight per 100 parts by weight of the polyolefin resin, having an insulation resistance of not more than $10^{10}$ Ω•cm; an insulating layer coating the resin composition layer, the insulation layer comprising polyethylene having a softening temperature of not lower than 105° C.; and a fire retardant protective coating layer coating the insulating layer, the fire retardant protective coating layer comprising (1) a terpolymer of ethylene, vinyl acetate and vinyl chloride, and/or a terpolymer of ethylene, methyl methacrylate and vinyl chloride, and (2) a copolymer of chlorinated ethylene and vinyl chloride; the resin composition layer, the insulating layer and the fire retardant protective coating layer each being crosslinked.

5 Claims, 1 Drawing Sheet

DC HIGH-VOLTAGE WIRE

FIELD OF THE INVENTION

The present invention relates to a DC high-voltage wire suitable for a high-voltage wiring in electronic equipment such as a high-voltage lead wire for a television receiver.

BACKGROUND OF THE INVENTION

High-voltage wires used for high-voltage lead wires of television receivers and other equipment are known, for example, from JP-B-51-8465, JP-B-U-56-55859, and JP-B-60-38805 (the term "JP-B" used herein means an examined Japanese patent publication, and the term "JP-B-U" used herein means an examined Japanese utility model publication).

JP-B-51-8465 discloses an insulated wire having fire retardancy and superior electric characteristics at a high temperature. This wire comprises a conductor having thereon a crosslinked insulation layer, and a protective coating layer provided on the insulation layer. The crosslinked insulation layer is mainly composed of polyethylene having a melting point of 105° C. or higher. The protective coating layer is mainly composed of a terpolymer of ethylene, vinyl acetate, and vinyl chloride.

JP-B-U-56-55859 discloses a high-voltage lead wire for a television receiver. This wire has a three layer structure of polyethylene insulation provided on a conductor, a flame resistant layer of electron-beam-irradiated polyvinyl chloride on the polyethylene insulation, and a crosslinked polyethylene sheath provided further thereon.

JP-B-60-38805 discloses an insulated wire having an insulation layer mainly composed of polyethylene provided on a conductor, and a fire retardant protective coating layer provided further thereon.

As mentioned above, every conventional high-voltage insulated wire has an insulation layer mainly composed of polyethylene and a fire retardant protective coating layer provided further thereon.

Conventional high-voltage wires having the above-mentioned structure have a remarkably high initial breakdown voltage of approximately 300 KV. The breakdown voltage does, however, decrease significantly during use over the long term. This decrease in the breakdown voltage does not cause any problems under mild service conditions. Recently, however, modern television receivers have become multi-functional and the high-voltage wires in these receivers are subjected to severe electrical conditions. For example, a grounding wire and a high-voltage wire are frequently in close proximity where it is highly probable that the decrease of the breakdown voltage during long term use will cause severe electrical damage.

SUMMARY OF THE INVENTION

An object of the present invention is to provide a high-voltage wire for direct current (DC) which does not experience a significant decrease in breakdown voltage during long term use.

The above and other objects and effects of the present invention will be from the following description.

The above objects of the present invention are attained by a DC high-voltage wire comprising: a conductor; a resin composition layer coating the conductor, the resin layer comprising a polyolefin resin containing carbon black in an amount of not less than 10 parts by weight per 100 parts by weight of the polyolefin resin, having an insulation resistance of not more than $10^{10}$ Ω•cm; an insulating layer coating the resin compsition layer, the insulation layer comprising polyethylene having a softening temperature of not lower than 105° C.; and a fire retardant protective coating layer coating the insulating layer, the fire retardant protective coating layer comprising (1) a terpolymer of ethylene, vinyl acetate and vinyl chloride, and/or a terpolymer of ethylene, methyl methacrylate and vinyl chloride, and (2) a graft copolymer of chlorinated polyethylene and vinyl chloride; the resin composition layer, the insulating layer and the fire retardant protective coating layer each being crosslinked.

DETAILED DESCRIPTION OF THE INVENTION

Figure 1:
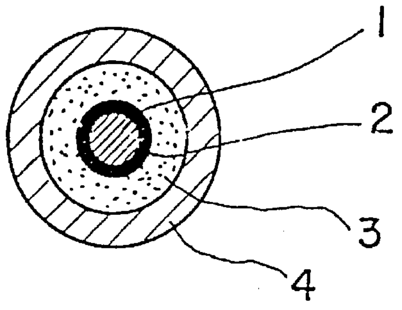
FIG. 1 illustrates a sectional view of an embodiment of the DC high-voltage wire of the present invention.

FIG. 1 illustrates a sectional view of a specific example of the DC high-voltage wire of the present invention.

In FIG. 1, 1 denotes a conductor; 2 denotes a resin composition layer composed of a polyolefin resin, such as polyethylene, containing carbon black in an amount of not less than 10 parts by weight per 100 parts by weight of the polyolefin resin having an insulation resistance of not more than $10^{10}$ Ω•cm provided on the conductor 1; 3 denotes an insulating layer of a composition mainly composed of polyethylene having a softening temperature of not lower than 105° C. provided on the layer 2; and 4 denotes a fire retardant protective coating layer of a composition mainly composed of a terpolymer of ethylene, vinyl acetate and vinyl chloride, and/or a terpolymer of ethylene, methyl methacrylate and vinyl chloride, and a graft copolymer of chlorinated polyethylene and vinyl chloride provided on the insulation layer 3.

The resin composition layer 2, the insulation layer 3, and the fire retardant protective layer 4, mentioned-above, may all be formed by extrusion molding, and all the layers are respectively crosslinked. The crosslinking may be conducted by radiation exposure, water crosslinking, etc. The crosslinking conditions are not limited and can be determined according to the materials used in the layers to be crosslinked. The insulation layer 3, for example, may be extruded to coat the resin composition layer 2, and the two layers may be simultaneously crosslinked, and then the fire retardant protective layer 4 can be extruded thereon, and crosslinked in turn. Alternately the three layers may be extrusion molded and crosslinked simultaneously.

The conductor may be any conventional conductors such as annealed copper wires, tin-plated annealed copper wires, copper alloy wires, etc. The diameter of the conductor is not limited, and solid conductors and stranded conductors such as those having a size of 7/0.254 mm may be used.

The thickness of the resin composition layer comprising a polyolefin resin containing carbon black is preferably from 0.05 to 0.30 mm. Any carbon black that can attain the required insulation resistance may be used. Examples of the polyolefin resin include polyethylene resins, ethylene-vinyl acetate copolymer resins, ethylene-ethyl acrylate resins and poly-α-olefin copolymer resins. The insulating resistance of the resin composition layer is preferably from $10^2$ to $10^{10}$ Ω•cm.

The thickness of the insulating layer comprising polyethylene is preferably from 0.15 to 2.00 mm. Any polyethylene resins Raving a softening temperature of not lower than 105° C. can be used, but those having a melt index of 20 or less are preferred.

The thickness of the fire retardant protective coating layer is preferably from 0.15 to 2.00 mm.

In the terpolymer of ethylene, vinyl acetate and vinyl chloride, the amount of vinyl acetate is preferably from 10 to 45 wt % based on the total amount of ethylene and vinyl acetate; and the amount of vinyl chloride is preferably 50 wt % or less based on the total amount of the terpolymer. In the terpolymer of ethylene, methyl methacrylate and vinyl chloride, the amount of methyl methacrylate is preferably from 10 to 45 wt % based on the total amount of ethylene and methyl methacrylate; and the amount of vinyl chloride is preferably 50 wt % or less based on the total amount of the terpolymer.

The term "graft copolymer of chlorinated polyethylene and vinyl chloride" used herein means a graft copolymer in which vinyl chloride monomers are graft-polymerized on a chlorinated polyethylene. The amount of vinyl chloride is preferably from 40 to 60 wt % based on the amount of the graft copolymer. The chlorination degree of the chlorinated polyethylene is preferably from 15 to 40%.

The molecular weight of the terpolymers and the graft copolymer are not limited if they can be molded, e.g., by extrusion molding. The weight ratio of the terpolymers to the graft copolymer (terpolymers/graft copolymer) is preferably 50/50 or more and less than 100/0, and more preferably from 50/50 to 95/5.

The resin composition layer, the insulating layer and the fire retardant protective coating layer each may further contain any conventional additives such as an antioxidant, a fire retarder, a lubricant, etc.

The inventors of the present invention had previously investigated the prevention of the thermal deterioration of a polyethylene insulation layer in order to prevent decrease of the breakdown voltage of a conventional high-voltage wire during a prolonged use without success.

As the result of further comprehensive study, the inventors found that a resin composition layer 2 comprising carbon-black-containing polyethylene, as provided by the present invention, when positioned between the conductor 1 and an insulating layer 3 comprising polyethylene prevents a decrease of the breakdown voltage after prolonged use.

Heretofore a semiconductive layer containing carbon black provided between a conductor and an insulating layer was known to improve the breakdown voltage of an AC wire as disclosed, for example, in *Sumitomo Denki* (Sumitomo Electric), Vol. 82, pages 27 to 34 (October 1963).

In DC high-voltage wires like those of the present invention, however, the presence of a resin layer containing carbon black does not significantly affect the initial breakdown voltage. The breakdown voltage is around DC 300 KV independently of the presence or the absence of the carbon-containing resin layer. Unexpectedly, however, the breakdown voltage of the high-voltage wire of the present invention has been found to decrease little even after a heat aging for the purpose of simulating prolonged use, while that of a high-voltage wire of conventional construction decreased to below DC 200 KV after the same aging test. Thus, the DC high-voltage wire of the present invention exhibited unexpectedly the effect of preventing the decrease of breakdown voltage.

The content of the carbon in the resin composition layer is defined to be not less than 10 parts by weight per 100 parts by weight of the polyolefin resin since, even with the highest electroconductivity of carbon black, the insulation resistance of not more than $10^{10}$ Ω•cm can be attained only by addition of carbon black in an amount of 10 parts by weight or more.

The present invention will be described in more detail by referring to the following example, but the present invention is not construed as being limited thereto.

EXAMPLE

A copper wire (conductor) of 0.813 mm diameter was coated with a carbon-containing resin composition layer composed of a copolymer of ethylene-ethyl acrylate (ethyl acrylate content: 18 wt %, melt index: 6) containing 50 parts by weight of acetylene black per 100 parts by weight of the copolymer and having an insulation resistance of $5\times10^4$ Ω•cm via extrusion coating to a thickness of 0.1 mm. It was further coated with a high density polyethylene having a melting point of 120° C. via extrusion coating to give an outer diameter of 2.813 mm and thus forming the insulation layer. Further, it was coated with a resin composition comprising 40 parts by weight of a terpolymer of ethylene-vinyl acetate-vinyl chloride (total content of ethylene and vinyl acetate: 55 wt %, polymerization degree: 1,300), 40 parts by weight of a terpolymer of ethylene-methyl methacrylate-vinyl acetate (total content of ethylene and methyl methacrylate: 55 wt %, polymerization degree: 1,000), and 20 parts by weight of a graft copolymer of chlorinated polyethylene vinyl chloride (chlorinated polyethylene content: 45 wt %, chlorination degree of chlorinated polyethylene: 20%, Denka GC31 produced by Denki Kagaku Kogyo K.K.) to give an outer diameter of 5.813 mm. The above-mentioned coating layers were crosslinked by irradiation with an electron ray of 2 MeV at a dose of 15 Mrad. These operations produced a DC high-voltage wire according to the present invention.

Figure 2:
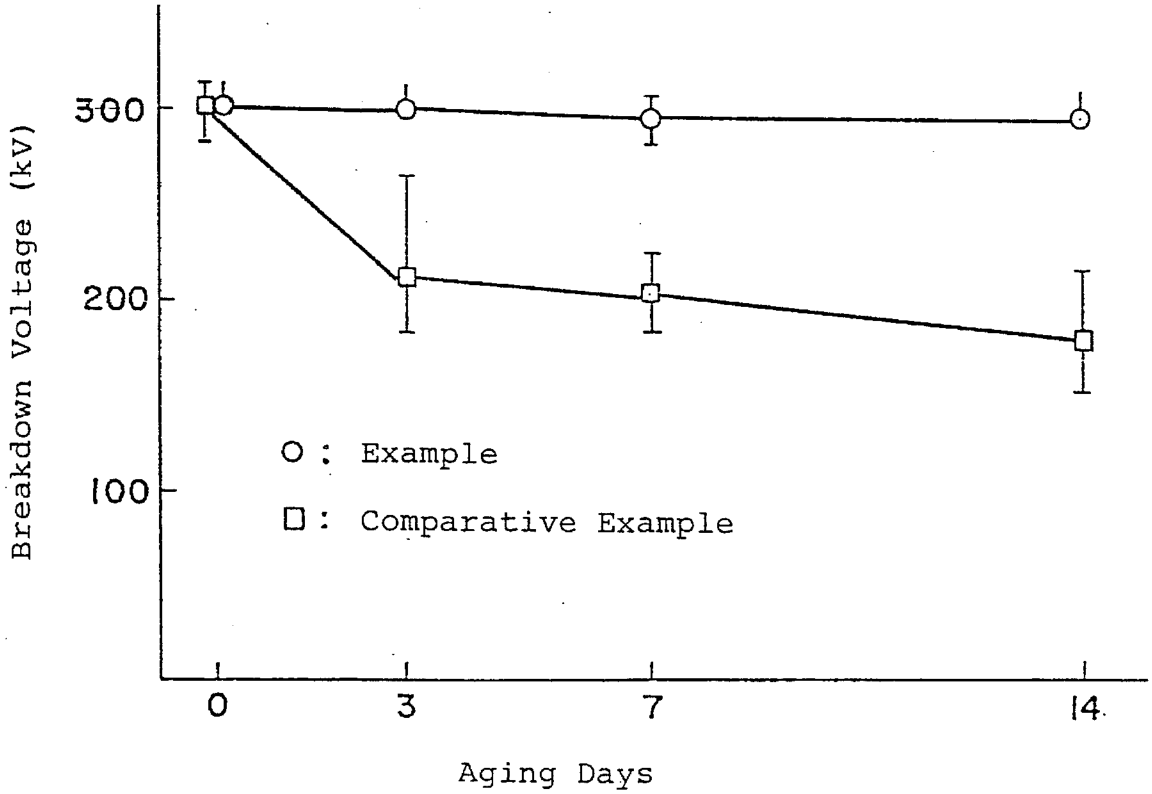
FIG. 2 shows the results of DC breakdown tests.

The DC high-voltage wire was cut into pieces 3 m long; 4 sets of 5 samples were heated in a thermostat for 0 day (not heated), 3 days, 7 days, and 14 days, respectively. The wires were fixed in a water vessel so that the 1 m portions of the wires were immersed in water, and positive DC voltage was applied at a rate of approximately 10 KV/sec with the water being grounded to measure the breakdown voltage. FIG. 2 shows the results. Samples that had not broken down at 300 KV were held at 300 kV for an additional 1 minute. Samples which had not broken down after the additional 1 minute were considered to have a dielectric strength of 300 KV or higher.

For comparison, a copper wire of 0.813 mm diameter was coated with a high-density polyethylene having a melting point of 120° C. by extrusion coating to an outer diameter of 2.813 mm. It was further coated with a fire retardant protective layer having the same composition as that in the above to give an outer diameter of 5.813 mm. Subsequently it is crosslinked by irradiation in the same manner as in the above. The resultant wire was tested for the breakdown voltage after heat aging in the same manner as above. FIG. 2 shows the results with the comparative example.

FIG. 2 shows that the initial breakdown voltage (at aging for 0 day) in the example and the comparative example are not different from each other, but with the lapse of the aging days, the value decreased to below 200 KV in the comparative example while the initial value was maintained at almost the same level in the example of the present invention.

As discussed above, the DC high-voltage wire of the present invention does not show a decrease of the breakdown voltage even over the long term, and reliable under electrically severe conditions.

While the invention has been described in detail and with reference to specific embodiments thereof, it will be apparent to one skilled in the art that various changes and modifications can be made therein without departing from the spirit and scope thereof.

What is claimed is:

1. A DC high-voltage wire comprising;

(a) a conductor;

(b) a resin composition layer coating said conductor, said resin composition layer comprising a polyolefin resin containing carbon black in an amount of not less than 10 parts by weight per 100 parts per weight of said polyolefin resin, said polyolefin resin having an insulation resistance of not more than $10^{10}$ Ω•cm;

(c) an insulating layer coating said resin composition layer, said insulating layer comprising polyethylene having a softening temperature not lower than 105° C.; and (d) a fire retardant protective coating layer coating said insulating layer, said fire retardant protective coating layer comprising (1) a first component selected from the group consisting of (i) a terpolymer of ethylene, vinyl acetate, and vinyl chloride;

(ii) a terpolymer of ethylene, methyl methacrylate, and vinyl chloride; and (iii) a terpolymer of ethylene, vinyl acetate, and vinyl chloride, and a terpolymer of ethylene, methyl methacrylate, and vinyl chloride; and (2) a second component consisting of a graft copolymer of chlorinated polyethylene and vinyl chloride;

wherein said resin composition layer, said insulating layer, and said fire retardant protective coating layer are each crosslinked.

2. A DC high-voltage wire as claimed in claim 1, wherein said resin composition layer has an insulation resistance of from $10^2$ to $10^{10}$ Ω•cm.

3. A DC high-voltage wire as claimed in claim 1, wherein the weight ratio of said first component to said second component is from 50:50 to less than 100:0.

4. A DC high-voltage wire as claimed in claim 1, wherein the weight ratio of said first component to said second component is from 50:50 to 95:5.

5. A DC high-voltage wire as claimed in claim 1, wherein said resin composition layer is from 0.05 to 0.30 mm thick, said insulating layer is from 0.15 to 2.00 mm thick, and said fire retardant protective coating layer is from 0.15 to 2.00 mm thick.

* * * * *